(12) United States Patent
Sakamaki (10) Patent No.: US 11,657,239 B2
(45) Date of Patent: May 23, 2023

(54) DISTURBING MAGNETIC FIELD GENERATOR AND CARD READER

(71) Applicant: NIDEC SANKYO CORPORATION, Nagano (JP)

(72) Inventor: Hirotaka Sakamaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/356,515

(22) Filed: Jun. 24, 2021

(65) Prior Publication Data

US 2021/0406488 A1 Dec. 30, 2021

(30) Foreign Application Priority Data

Jun. 30, 2020 (JP) .............................. JP2020-112500

(51) Int. Cl.
*G06K 7/08* (2006.01)

(52) U.S. Cl.
CPC .................................. *G06K 7/087* (2013.01)

(58) Field of Classification Search
CPC ... G06K 7/087; G07F 7/0873; G07F 19/2055; G07F 19/20; G11B 5/00808; H01F 7/00
USPC .......................................................... 235/449
See application file for complete search history.

(56) References Cited

U.S. PATENT DOCUMENTS 10,783,333 B2  9/2020  Sakamaki

FOREIGN PATENT DOCUMENTS

| CN | 103476486 B | * 10/2017 | .............. A61M 1/14 |
| JP | 2012118689 A | * 6/2012 | ....... G06K 19/07336 |

* cited by examiner

*Primary Examiner* — Thien M Le
*Assistant Examiner* — Tae W Kim
(74) *Attorney, Agent, or Firm* — Hauptman Ham, LLP (57) ABSTRACT

Provided are a disturbing magnetic field generator and a card reader capable of suppressing the generation of noise caused by vibration of a core. A disturbing magnetic field generator that generates a disturbing magnetic field for disturbing unauthorized reading of magnetic data recorded on a card includes a coil to generate the disturbing magnetic field, a bobbin including a tubular body part in which the coil is wound on an outer peripheral side, and a core disposed inside the tubular body part. A first gap is provided between the tubular body part and the core.

15 Claims, 7 Drawing Sheets

DISTURBING MAGNETIC FIELD GENERATOR AND CARD READER

RELATED APPLICATIONS

The present application claims priority to Japanese Application Number 2020-112500, filed Jun. 30, 2020, the disclosure of which is hereby incorporated by reference herein in its entirety.

BACKGROUND

Field of the Invention

At least an embodiment of the present invention relates to a disturbing magnetic field generator and a card reader capable of disturbing unauthorized reading of magnetic data.

Description of the Related Documents

In the past, it has been proposed to install a disturbing magnetic field generator in a card reader to prevent skimming, which is the unauthorized reading of magnetic data recorded on a card (see, for example, Japanese Unexamined Patent Application Publication No. 2019-175529). The disturbing magnetic field generator described in Japanese Unexamined Patent Application Publication No. 2019-175529 includes a core and a coil wound around the core via a bobbin, and is disposed inside a card insertion part of a card reader. In addition, it is also proposed in Japanese Unexamined Patent Application Publication No. 2019-175529 that the core and coil be housed in a case to facilitate handling of the disturbing magnetic field generator.

In such a disturbing magnetic field generator, when a relatively large AC signal is supplied to the coil in an attempt to generate a relatively strong disturbing magnetic field, the core vibrates and the core vibration is transmitted to the case, causing the disturbing magnetic field generator to generate a relatively large noise. In addition, since the disturbing magnetic field generator is disposed inside the card insertion slot in the card reader, the relatively loud noise generated by the disturbing magnetic field generator may cause discomfort to the user of the card reader. Therefore, in Japanese Unexamined Patent Application Publication No. 2019-175529, a structure in which the inside of the case is sealed by resin is proposed. Furthermore, a structure is proposed in which the core and coil are separated from the inner surface of the case so as not to contact the inner surface of the case, and the inside of the case is sealed with resin between the core and the case and between the coil and the case.

However, even when the inside of the case is sealed by resin, if the source of vibration and the card insertion part are rigidly coupled through resin or the like, there is a problem that the vibration of the core is transmitted to the card insertion part, and a relatively large noise is generated from the card insertion part.

In view of the above problem, it is an issue of at least an embodiment of the present invention to provide a disturbing magnetic field generator and a card reader capable of suppressing the generation of noise caused by vibration of a core.

SUMMARY

In order to solve the above problem, one aspect of at least an embodiment of the present invention is a disturbing magnetic field generator that generates a disturbing magnetic field for disturbing unauthorized reading of magnetic data recorded on a card, and includes a coil to generate the disturbing magnetic field, a bobbin including a tubular body part in which the coil is wound on an outer peripheral side, and a core disposed inside the tubular body part. A first gap is provided between the tubular body part and the core. In the one aspect of at least an embodiment of the present invention, since the first gap is provided between the tubular body part of the bobbin and the core, transmission of vibration from the core to the bobbin is suppressed. Accordingly, the generation of noise caused by the vibration of the core can be suppressed.

In at least an embodiment of the present invention, an aspect in which the tubular body part and the core are bonded by a soft adhesive provided in the first gap can be adopted. According to such an aspect, even if the tubular body part of the bobbin and the core are fixed, transmission of vibration from the core to the bobbin is suppressed. Accordingly, the generation of noise caused by the vibration of the core can be suppressed.

In at least an embodiment of the present invention, an aspect can be adopted in which a circuit board disposed so as to overlap the coil is included, the circuit board includes a circuit to feed the coil, the bobbin includes a plurality of projection parts, and the circuit board is fixed to the bobbin via the plurality of projection parts. According to such an aspect, since the coupling points between the bobbin and the circuit board are limited to the projection parts, transmission of vibration from the bobbin to the circuit board is suppressed. Accordingly, the generation of noise caused by the vibration of the core can be suppressed.

In at least an embodiment of the present invention, an aspect can be adopted in which the circuit board is bonded to the bobbin by a soft adhesive provided between the circuit board and the plurality of projection parts. According to such an aspect, even if the bobbin and the circuit board are fixed, transmission of vibration from the bobbin to the circuit board is suppressed. Accordingly, the generation of noise caused by the vibration of the core can be suppressed.

In at least an embodiment of the present invention, an aspect can be adopted in which a circuit board disposed so as to overlap the coil is included, the circuit board includes a circuit to feed the coil, and a second gap is provided between the circuit board and the coil. According to such an aspect, since the second gap is provided between the coil and the circuit board, transmission of vibration from the coil to the circuit board is suppressed. Accordingly, the generation of noise caused by the vibration of the core can be suppressed.

In at least an embodiment of the present invention, an aspect in which the circuit board and the coil are bonded by a soft adhesive provided in the second gap can be adopted. According to such an aspect, even if the coil and the circuit board are fixed, transmission of vibration from the coil to the circuit board is suppressed. Accordingly, the generation of noise caused by the vibration of the core can be suppressed.

In at least an embodiment of the present invention, an aspect can be adopted in which a card insertion part provided with an insertion slot through which the card is inserted is included, the disturbing magnetic field generator includes a case in which the coil, the bobbin, and the core are housed inside, the card insertion part includes a case housing part in which the case is housed inside, and the case is housed in the case housing part in such a manner that an outer wall of the case and an inner wall of the case housing part face each other via a third gap in an extending direction of the core.

According to such an aspect, in the extending direction of the core, where vibration is easily transmitted, since the third gap is provided between the case and the inner wall of the case housing part, transmission of vibration from the case to the inner wall of the case housing part is suppressed. Accordingly, the generation of noise caused by the vibration of the core can be suppressed.

In at least an embodiment of the present invention, an aspect in which the case and the inner wall of the case housing part are bonded by a soft adhesive provided in the third gap can be adopted. According to such an aspect, even if the case and the inner wall of the case housing part are fixed, transmission of vibration from the case to the inner wall of the case housing part is suppressed. Accordingly, the generation of noise caused by the vibration of the core can be suppressed.

In at least an embodiment of the present invention, an aspect can be adopted in which a case main body formed in a shape of a rectangular box with an openable upper side is included, and the upper side of the case main body is released. According to such an aspect, since there is no cover or the like that closes the upper side of the case main body, the generation of noise due to the vibration of the cover or the like caused by the vibration of the core can be suppressed.

Another aspect of at least an embodiment of the present invention is a disturbing magnetic field generator that generates a disturbing magnetic field for disturbing unauthorized reading of magnetic data recorded on a card, and includes a coil to generate the disturbing magnetic field, a bobbin including a tubular body part in which the coil is wound on an outer peripheral side, a core disposed inside the tubular body part, and a circuit board disposed so as to overlap the coil. The circuit board includes a circuit to feed the coil, the bobbin includes a plurality of projection parts, and the circuit board is fixed to the bobbin via the plurality of projection parts. In the another aspect of at least an embodiment of the present invention, since the coupling points between the bobbin and the circuit board are limited to the projection parts, transmission of vibration from the bobbin to the circuit board is suppressed. Accordingly, the generation of noise caused by the vibration of the core can be suppressed.

Still another aspect of at least an embodiment of the present invention is a disturbing magnetic field generator that generates a disturbing magnetic field for disturbing unauthorized reading of magnetic data recorded on a card, and includes a coil to generate the disturbing magnetic field, a bobbin including a tubular body part in which the coil is wound on an outer peripheral side, a core disposed inside the tubular body part, and a circuit board disposed so as to overlap the coil. The circuit board includes a circuit to feed the coil, and a second gap is provided between the circuit board and the coil. In the still another aspect of at least an embodiment of the present invention, since the second gap is provided between the coil and the circuit board, transmission of vibration from the coil to the circuit board is suppressed. Accordingly, the generation of noise caused by the vibration of the core can be suppressed.

Still another aspect of at least an embodiment of the present invention is a card reader including a card insertion part provided with an insertion slot through which a card is inserted, and a disturbing magnetic field generator that generates a disturbing magnetic field for disturbing unauthorized reading of magnetic data recorded on the card. The disturbing magnetic field generator includes a coil to generate the disturbing magnetic field, and a case in which the coil and a core are housed inside. The card insertion part incudes a case housing part in which the case is housed inside. The case is housed in the case housing part in such a manner that an outer wall of the case and an inner wall of the case housing part face each other via a third gap in an extending direction of the core. In the still another aspect of at least an embodiment of the present invention, in the extending direction of the core, where vibration is easily transmitted, since the third gap is provided between the case and the inner wall of the case housing part, transmission of vibration from the case to the inner wall of the case housing part is suppressed. Accordingly, the generation of noise caused by the vibration of the core can be suppressed.

In at least an embodiment of the present invention, at least one of transmission of vibration from the core to the bobbin, transmission of vibration from the bobbin to the circuit board, transmission of vibration from the coil to the circuit board, and transmission of vibration from the case to the inner wall of the case housing part is suppressed. Accordingly, the generation of noise caused by the vibration of the core can be suppressed.

BRIEF DESCRIPTION OF THE DRAWINGS

Embodiments will now be described, by way of example only with reference to the accompanying drawings which are meant to be exemplary not limiting, and wherein like elements are numbered alike in several figures, in which.

DETAILED DESCRIPTION

With reference to the drawings, a card reader and a disturbing magnetic field generator, to which at least an embodiment of the present invention is applied, is described. The soft adhesives and sealing resins described below mean, for example, adhesives and sealing resins having elasticity with a Shore A of 500 or less.

Schematic Configuration of Card Reader

Figure 1:
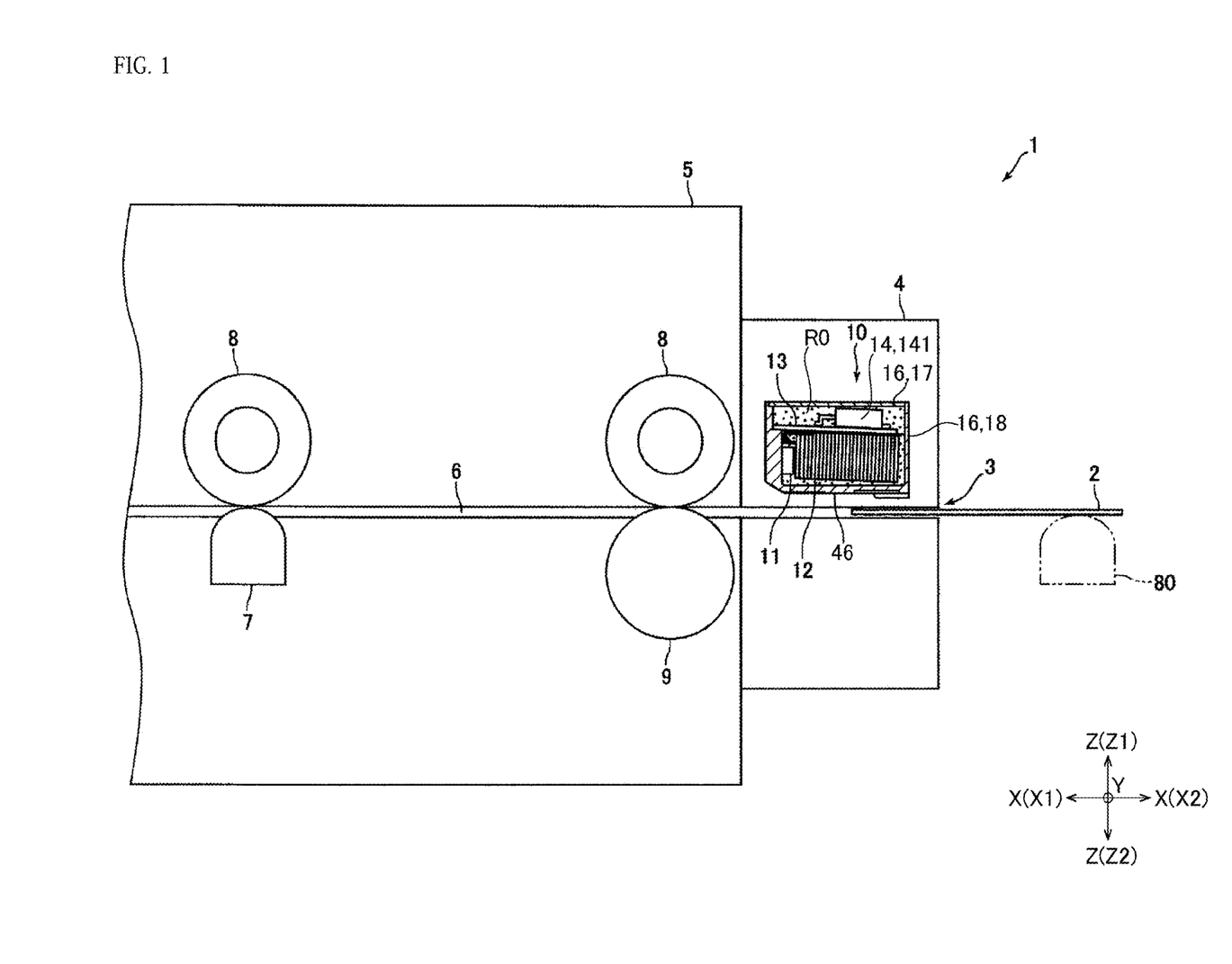
FIG. 1 is a schematic side view of the card insertion part side of a card reader according to at least an embodiment of the present invention.
Figure 2:
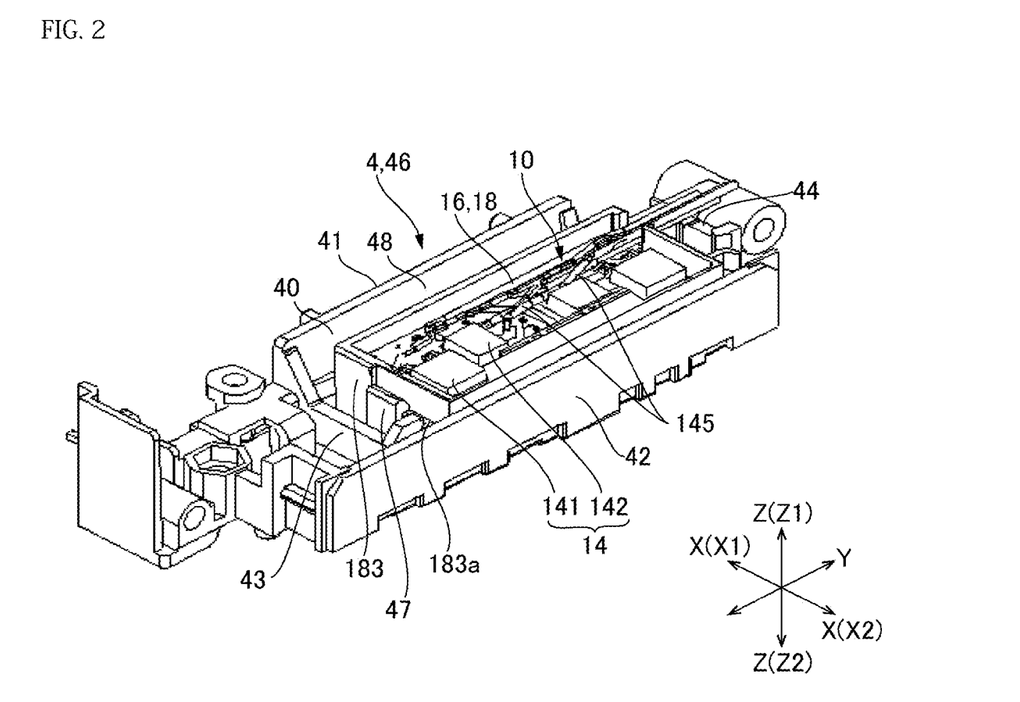
FIG. 2 is a perspective view illustrating a disturbing magnetic field generator illustrated in FIG. 1 disposed in a case housing part of the card insertion part.
Figure 3:
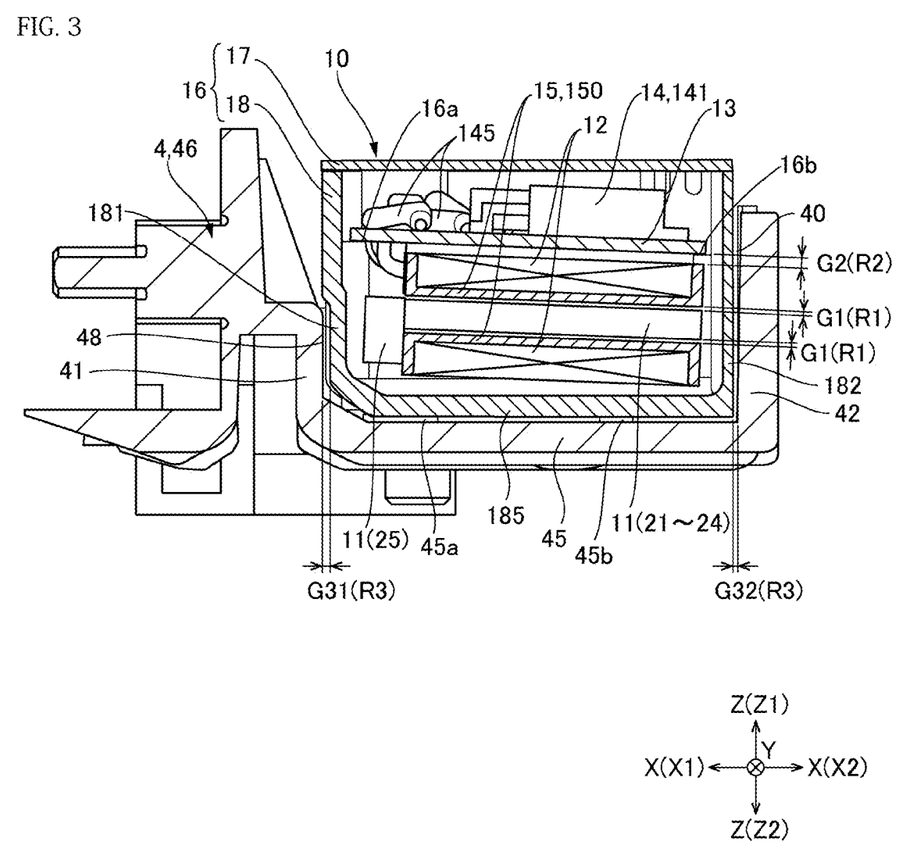
FIG. 3 is a cross-sectional view of the disturbing magnetic field generator illustrated in FIG. 2.

FIG. 1 is a schematic side view of a card insertion part 4 side of a card reader 1 according to an embodiment of at least an embodiment of the present invention. FIG. 2 is a perspective view illustrating a disturbing magnetic field generator 10 illustrated in FIG. 1 disposed in a case housing part 40 of the card insertion part 4. FIG. 3 is a cross-sectional view of the disturbing magnetic field generator 10 or the like illustrated in FIG. 2, and corresponds to the XZ cross-sectional view of the disturbing magnetic field generator 10 or the like illustrated in FIG. 2.

The card reader 1 illustrated in FIG. 1 is a device for reading magnetic data recorded on a card 2 and for recording magnetic data onto the card 2, and is used, for example, in a predetermined higher-level device such as an ATM (Automated Teller Machine). The card reader 1 includes a card insertion part 4 in which a card insertion slot 3 is formed into which the card 2 is inserted, and a main body part 5. A card transfer path 6 is formed inside the card reader 1, through which the card 2 inserted through the card insertion slot 3 transfers.

The card reader 1 includes a magnetic head 7 that performs at least one of reading magnetic data recorded on the card 2 and recording magnetic data onto the card 2. In addition, the card reader 1 includes a drive roller 8 and a pad roller 9 for conveying the card 2. Moreover, the card reader 1 includes a disturbing magnetic field generator 10 that generates a disturbing magnetic field for disturbing unauthorized reading of magnetic data recorded on the card 2.

In the card reader 1, the card 2 transfers in the X direction illustrated in FIG. 1 along the card transfer path 6. In addition, the card 2 inserted through the card insertion slot 3 transfers in an X1 direction and is taken into the card reader 1, and the card 2 ejected from the card insertion slot 3 transfers in an X2 direction. Moreover, a Z direction in FIG. 1 or the like, which is orthogonal to the X direction, is the thickness direction of the card 2 taken by the card reader 1, and a Y direction in FIG. 1 or the like, which is orthogonal to the X and Z directions, is the width direction of the card 2 taken by the card reader 1.

In the following description, the X direction is referred to as the "front-rear" direction, the Y direction is referred to as the "right-left" direction, and the Z direction is referred to as the "up-down" direction. In addition, one side of the front-rear direction (X1 direction side in FIG. 1, etc.) is the rear side, and the opposite side, an X2 direction side in FIG. 1 or the like, is the front side, and one side of the up-down direction (Z1 direction side in FIG. 1, etc.) is the up side, and the opposite side, a Z2 direction side in FIG. 1 or the like, is the down side.

The card 2 is, for example, a card made of vinyl chloride of a rectangular shape having a thickness of approximately 0.7 to 0.8 mm. On the back side of the card 2, a magnetic stripe is formed in which magnetic data is recorded. The magnetic stripe is formed along the longitudinal direction of the card 2 which is formed in a rectangular shape. The card 2 is inserted into the card reader 1 with the back side of the card 2 facing downward and with the longitudinal direction of the card 2 substantially coinciding with the front-rear direction, and is conveyed in the card transfer path 6. An IC chip may be incorporated in the card 2. In addition, the card 2 may be a card made of polyethylene terephthalate having a thickness of approximately 0.18 to 0.36 mm, or a paper card or the like having a predetermined thickness.

The card insertion part 4 is attached to the front end face of the main body part 5. The card insertion part 4 is formed in a hollow shape, and the disturbing magnetic field generator 10 is disposed inside the card insertion part 4. The disturbing magnetic field generator 10 of this embodiment is disposed on the upper side of the card transfer path 6. Note that the disturbing magnetic field generator 10 of this embodiment may be disposed on the lower side of the card transfer path 6. The specific configuration of the disturbing magnetic field generator 10 will be described later.

The magnetic head 7, the drive roller 8, and the pad roller 9 are disposed inside the main body part 5. The magnetic head 7 is disposed so as to face the card transfer path 6 from below. In addition, the magnetic head 7 is disposed in the right-left direction at a position through which the magnetic stripe of the card 2 passes. A motor is connected to the drive roller 8 via a power transmission mechanism such as a belt or pulley. The drive roller 8 and the pad roller 9 face each other in the up-down direction. The pad roller 9 is urged toward the drive roller 8. The card 2 is conveyed in a state of being sandwiched between the drive roller 8 and the pad roller 9.

As illustrated in FIGS. 2 and 3, disposing the disturbing magnetic field generator 10 in the card reader 1, the disturbing magnetic field generator 10 is housed inside a hollow holder 46 provided inside the card insertion part 4 of the card reader 1. The inside of the holder 46 is the case housing part 40, and a case housing part 40 has a substantially rectangular shape in which the dimensions in the right-left direction are longer than the dimensions in the front-rear direction. More specifically, the holder 46 includes a bottom plate part 45, a rear plate part 41 projecting upwardly from the rear end portion of the bottom plate part 45, and a front plate part 42 projecting upwardly from the front end portion of the bottom plate part 45. The rear plate part 41 and the front plate part 42 face each other in the front-rear direction. In addition, the holder 46 includes a right plate part 43 projecting upwardly from the left end portion of the bottom plate part 45, and a left plate part 44 projecting upwardly from the right end portion of the bottom plate part 45. The right plate part 43 and the left plate part 44 face each other in the right-left direction. Accordingly, the case housing part 40 is enclosed by the bottom plate part 45, the rear plate part 41, the front plate part 42, the right plate part 43, and the left plate part 44. The rear plate part 41, the front plate part 42, the right plate part 43, and the left plate part 44 constitute an inner wall 48 of the case housing part 40.

In the card reader 1 thus configured, when the card 2 is inserted into the card insertion slot 3 and the card 2 is taken into the card reader 1, the disturbing magnetic field generator 10 generates a disturbing magnetic field until, for example, the entire card 2 inserted into the card insertion slot 3 is taken into the card insertion part 4. In addition, in the card reader 1, when the card 2 is ejected from the card insertion slot 3, the disturbing magnetic field generator 10 generates a disturbing magnetic field until, for example, the card 2, which has been conveyed to a position where the card 2 can be withdrawn by a user, is withdrawn by the user. In other words, when reading or recording magnetic data by the magnetic head 7, the disturbing magnetic field generator 10 does not generate any disturbing magnetic field.

Figure 4:
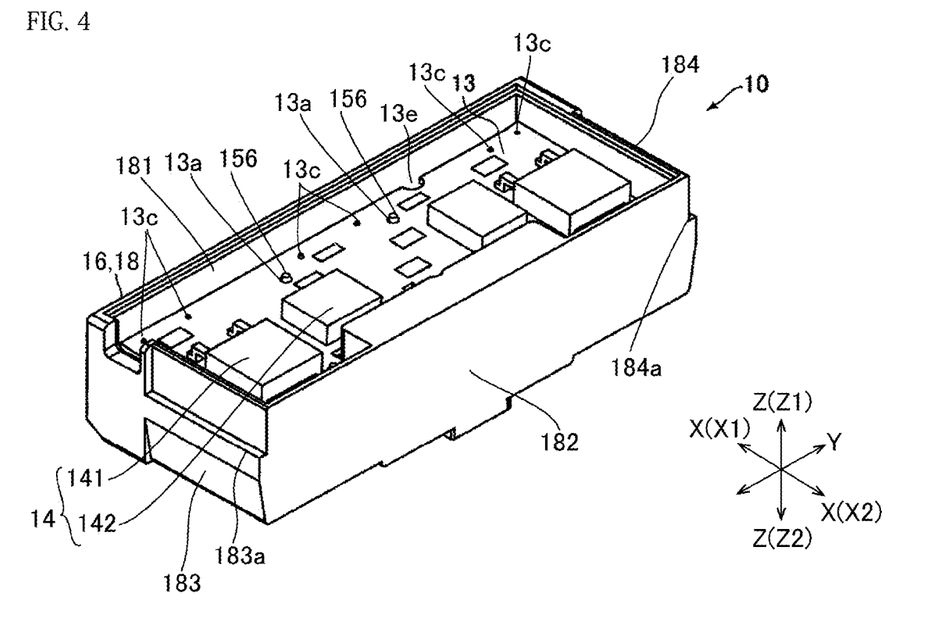
FIG. 4 is a perspective view of the disturbing magnetic field generator illustrated in FIG. 2.
Figure 5:
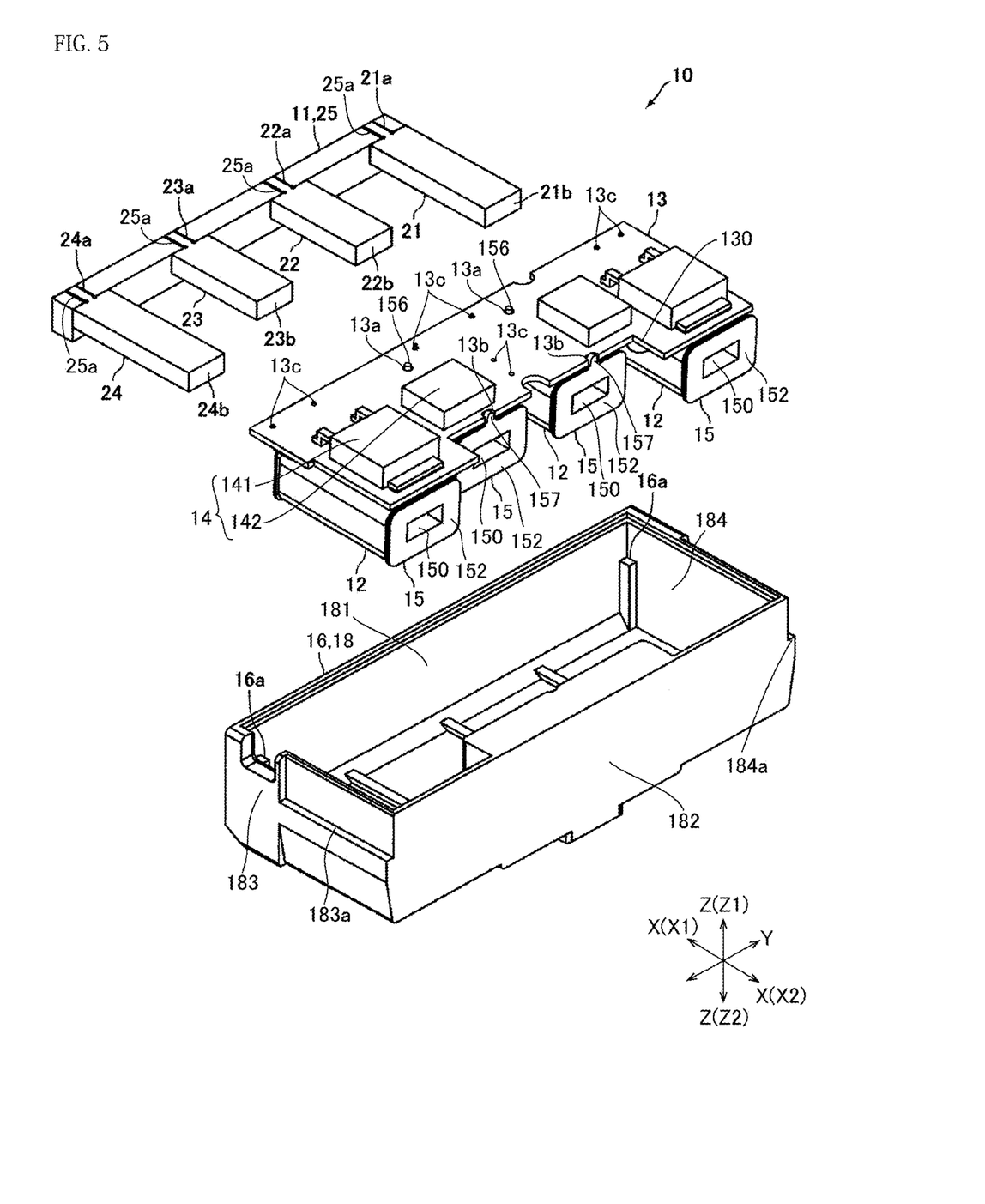
FIG. 5 is an exploded perspective view of the disturbing magnetic field generator illustrated in FIG. 2.
Figure 6:
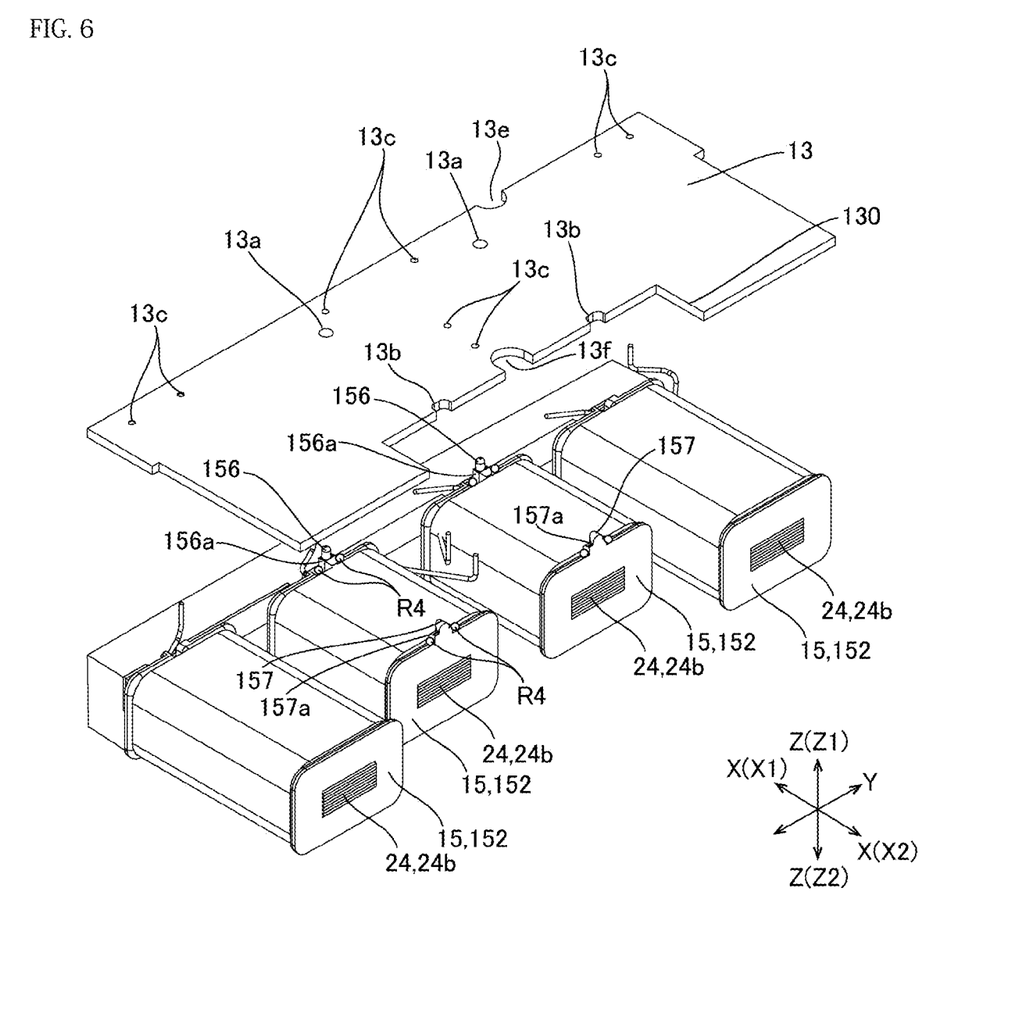
FIG. 6 is an exploded perspective view of a bobbin illustrated in FIG. 5, illustrating a projection part or the like for coupling with a circuit board.

Overall Configuration of Disturbing Magnetic Field Generator 10 FIG. 4 is a perspective view of the disturbing magnetic field generator 10 illustrated in FIG. 2. FIG. 5 is an exploded perspective view of the disturbing magnetic field generator 10 illustrated in FIG. 2. FIG. 6 is an exploded perspective view of a bobbin 15 illustrated in FIG. 5, illustrating a projection part or the like for coupling with a circuit board 13. In FIGS. 4 and 5, a lead wire 145 on the circuit board 13 is omitted, and in FIG. 6, the lead wire 145, electronic components 141 and 142, and the lands on the circuit board 13 are omitted.

As illustrated in FIGS. 3, 4, 5, and 6, the disturbing magnetic field generator 10 includes a coil 12 that generates a disturbing magnetic field, a bobbin 15 including a tubular body part 150 in which the coil 12 is wound on the outer periphery side, a core 11 disposed inside the tubular body part 150, and a circuit board 13 to which the coil 12 is electrically connected. In addition, the disturbing magnetic field generator 10 includes a case 16 in which the core 11, coil 12 and circuit board 13 are housed inside. The case 16 includes a case main body 18 formed in the shape of a substantially rectangular box with an openable upper side, and a cover 17 (see FIG. 1) which closes the opening of the upper side of the case main body 18.

The core 11 is a laminated core made of thin magnetic plates. In this embodiment, the core 11 includes a plurality of core dividers 21 to 25 that are formed separately, and five core dividers 21 to 25 are integrated. Since the core 11 is a laminated core formed by laminating thin magnetic plates, the core dividers 21 to 25 are also laminated cores formed by laminating thin magnetic plates.

The core dividers 21 to 25 are each formed in the shape of a linearly extending rod. More specifically, the core dividers 21 to 25 are formed in the shape of elongated substantially quadrangular prisms. The core dividers 21 to 24 are arranged in such a manner that the longitudinal direction coincides with the front-rear direction. In addition, the core dividers 21 to 24 are arranged parallel to each other with a certain interval in the right-left direction. The core dividers 21 to 24 are arranged in this order from one side to the other in the right-left direction. The thicknesses of the core dividers 21 to 24 in the up-down direction are equal, and the widths of the core dividers 21 to 24 in the right-left direction are equal.

The core divider 25 is arranged in such a manner that the longitudinal direction coincides with the right-left direction. Rear ends 21a to 24a of the core dividers 21 to 24 are fixed to the core divider 25. More specifically, the thickness of the core divider 25 in the up-down direction is thicker than the thickness of the core dividers 21 to 24, and four recessed parts 25a are formed in the core divider 25, in which the rear ends 21a to 24a are fitted from above. The core dividers 21 to 24 are fixed to the core divider 25 with the rear ends 21a to 24a fitted in the recessed parts 25a. In addition, the core dividers 21 to 24 are fixed to the core divider 25 by, for example, an adhesive applied to the recessed parts 25a, and the five core dividers 21 to 25 are integrated by the adhesive. Here, the width in the right-left direction of the rear ends 21a to 24a of the core dividers 21 to 24 is narrower than the width in the right-left direction of the portions other than the rear ends 21a to 24a of the core dividers 21 to 24. The core divider 21 and the core divider 24 are formed in the same shape, and the core divider 22 and the core divider 23 are formed in the same shape. The length of the core dividers 21 and 24 are longer than the length of the core dividers 22 and 23.

In the core 11 thus configured, the core dividers 21 to 24 are each disposed inside the tubular body part 150 of the bobbin 15, and the coil 12 is wound on the core 11 through the tubular body part 150 of the bobbin 15. More specifically, the disturbing magnetic field generator 10 includes four coils 12, and each of the four coils 12 is wound on the core dividers 21 to 24 via the bobbin 15. The bobbin 15 includes flange parts 151 and 152 on both ends of the tubular body part 150, and the coil 12 is wound between the flange parts 151 and 152.

Here, the length of the core dividers 21 and 24 are longer than the length of the core dividers 22 and 23. For this reason, the length of the tubular body part 150 of the bobbin 15 attached to the core dividers 21 and 24 is longer than the length of the tubular body part 150 of the bobbin 15 attached to the core dividers 22 and 23. Accordingly, the length of the coil 12 wound on the core dividers 21 and 24 is longer than the length of the coil 12 wound on the core dividers 22 and 23.

In this embodiment, among the four tubular body parts 150, in the tubular body part 150 that is attached to the core dividers 22 and 23 at the inner side in the right-left direction, the flange parts 151 and 152 are provided with projection parts 156 and 157 that project upwardly. In this embodiment, the projection parts 156 and 157 are stepped projection parts having upwardly facing stepped parts 156a and 157a at middle positions in the up-down direction.

Internal Configuration of Tubular Body Part 150

As illustrated in FIG. 3, in the disturbing magnetic field generator 10 of this embodiment, in a state where the core dividers 21 to 24 are each inserted inside the tubular body part 150 of the bobbin 15, a first gap G1 is formed between the tubular body part 150 and the core dividers 21 to 24. In this embodiment, a soft adhesive R1 such as a urethane adhesive, a silicon adhesive, a vinyl chloride adhesive, or the like is provided in the first gap G1, and the tubular body part 150 and the core dividers 21 to 24 are bonded by the adhesive R1. In FIG. 3, the first gap G1 is schematically illustrated with the same dimensions in the circumferential and axial directions, but the dimensions of the first gap G1 need not be uniform in the circumferential and axial directions.

Configuration of Circuit Board 13

Again, in FIGS. 3, 4, 5, and 6, the circuit board 13 is a rigid board such as a glass epoxy board. The circuit board 13 is disposed in such a manner that the thickness direction of the circuit board 13 is directed to the up-down direction. The circuit board 13 is disposed so as to overlap the four coils 12 from the above, and the core 11 and the bobbin 15 are located on the lower side of the circuit board 13, in addition to the coils 12. The circuit board 13 of this embodiment has a shape in which a quadrangular notch 130 is provided in the center of the front edge of a rectangular board extending in the right-left direction. On the upper side of the circuit board 13, a plurality of electronic components 141 and 142, and a lead wire 145 constituting a power feed circuit 14 that supplies alternating current to the coil 12 are provided, and the circuit board 13 is provided with a hole 13c for drawing out the end of the coil wire extending from the coil 12 upward.

When alternating current is supplied to the coil 12 from the power feed circuit 14, a disturbing magnetic field in which the direction of the magnetic line of force is directed from either one of a front face 21b of the core divider 21 and a front end face 23b of the core divider 23 to either other of the front end face 21b and the front end face 23b and a disturbing magnetic field in which the direction of the magnetic line of force is directed from either one of a front end face 22b of the core divider 22 and a front end face 24b of the core divider 24 to either other of the front end face 22b and the front end face 24b are generated.

Specifically, when alternating current is supplied to the coil 12, a disturbing magnetic field in which the direction of the magnetic line of force varies periodically in the direction from the front end face 21b to the front end face 23b and in the direction from the front end face 23b to the front end face 21b and a disturbing magnetic field in which the direction of the magnetic line of force varies periodically in the direction from the front end face 22b to the front end face 24b and in the direction from the front end face 24b to the front end face 22b are generated.

The coil 12 may be connected to a power feed circuit that includes a DC power supply to which the coil 12 is connected and a capacitor connected in parallel with the coil 12 with respect to the DC power supply. In this case, the capacitor and the coil 12 constitute a resonance circuit. In addition, the coil 12 may be connected to a DC power supply via a circuit such as an inverter that converts DC to AC. Moreover, in both cases where an AC power supply is connected to the coil 12 and where a DC power supply is connected to the coil 12, the timing for fluctuating the direction of the magnetic line of force need not be periodic.

As illustrated in FIG. 1, a magnetic head for skimming 80 for illegally reading the magnetic data recorded on the card 2 is assumed to be disposed in front of the card insertion slot 3 and below the card transfer path 6. Accordingly, in order to effectively exert the influence of the disturbing magnetic field generated by the disturbing magnetic field generator 10 on the magnetic head for skimming 80, the core dividers 21 to 24 are inclined so as to be slightly downward toward the front side, as illustrated in FIG. 3. In addition, since the core dividers 21 to 24 are inclined in this manner, the front end of the circuit board 13 is disposed slightly lower than the rear end of the circuit board 13, and the circuit board 13 is slightly inclined with respect to the front-rear direction.

Fixing Structure of Circuit Board 13

In FIGS. 3, 4, 5, and 6 again, the circuit board 13 has a hole 13a in which the projection part 156 of the flange part 151 fits at a position overlapping the flange part 151 of two tubular body parts 150 attached to the core dividers 22 and 23. In addition, in the circuit board 13, a notch 13b in which the projection part 157 fits is formed at a position overlapping the flange part 152. Accordingly, by fitting the projection parts 156 and 157 of the bobbin 15 into the hole 13a and the notch 13b of the circuit board 13, the circuit board 13 and the bobbin 15 can be positioned, and the circuit board 13 and the bobbin 15 can be fixed via the projection parts 156 and 157.

In this embodiment, as illustrated in FIG. 6, an adhesive R4 is applied to both the right and left sides of the projection parts 156 and 157 in the form of dots, and the circuit board 13 and the bobbin 15 are bonded by the adhesive R4. In doing so, a soft adhesive such as a urethane adhesive, a silicon adhesive, or a vinyl chloride adhesive is used as the adhesive R4.

In this state, the circuit board 13 overlaps the coil 12 from above. However, since each of the projection parts 156 and 157 has an upwardly facing stepped parts 156a and 157a in the middle position in the up-down direction, a second gap G2 is formed between the circuit board 13 and the coil 12 as illustrated in FIG. 3. In this embodiment, a soft adhesive R2 such as a urethane adhesive, a silicon adhesive, a vinyl chloride adhesive, or the like is provided in the second gap G2, and the circuit board 13 and the coil 12 are bonded by the adhesive R2. In FIG. 3, the second gap G2 is schematically illustrated with the same dimension in the axial direction, but the dimension of the second gap G2 need not be uniform in the axial direction.

Configuration of Case 16

In FIGS. 3, 4, 5, and 6 again, the case main body 18 includes a bottom plate part 185, a first side plate part 181 projecting upwardly from the rear end portion of the bottom plate part 185, and a second side plate part 182 projecting upwardly from the front end portion of the bottom plate part 185. The first side plate part 181 and the second side plate part 182 face each other in the front-rear direction. In addition, the case main body 18 includes a third side plate part 183 projecting upwardly from the left end portion of the bottom plate part 185, and a fourth side plate part 184 projecting upwardly from the right end portion of the bottom plate part 185. The third side plate part 183 and the fourth side plate part 184 face each other in the right-left direction.

As illustrated in FIG. 3, in the case 16, the case main body 18 includes a pair of right and left first board support parts 16a that support the circuit board 13 at two rear corners and a pair of right and left second board support parts 16b that support the circuit board 13 at two front corners. The upper end surfaces of the first board support parts 16a and the second board support parts 16b are flat, and the first board support parts 16a and the second board support parts 16b contact the lower surface of the circuit board 13 to support the circuit board 13 from below. In this state, a gap is formed between the front and rear end portions of the circuit board 13 and the inner surface of the case main body 18. Similarly, a gap is formed between the right and left end portions of the circuit board 13 and the inner surface of the case main body 18.

Sealing Structure within Case 16

In the disturbing magnetic field generator 10 thus configured, the interior of the case 16 is sealed by a soft sealing resin R0 such as a urethane resin, a silicon resin, or a vinyl chloride resin. Such a configuration can be achieved by disposing the core 11, the coil 12, the circuit board 13, and the bobbin 15 inside the case 16, and then filling the inside of the case 16 with the sealing resin R0. In this embodiment, the sealing resin R0 is filled below the circuit board 13 from a nozzle through notches 13e and 13f (see FIG. 6) formed in the edges of the circuit board 13.

Fixing Structure of Case 16 in Case Housing Part 40

As illustrated in FIG. 5, in the case main body 18, upwardly facing stepped parts 183a and 184a are formed on the outer surface of the third side plate part 183 and the outer surface of the fourth side plate part 184. As illustrated in FIG. 2, each of the inside of the right plate part 43 and the inside of the left plate part 44 of the holder 46 includes an engagement part 47 that engages from above the stepped parts 183a and 184a. Accordingly, when the case 16 is pushed from above into the inside of the case housing part 40, the case 16 is supported by a projection part 45a formed on the inner surface of the bottom plate part 45 of the holder 46 illustrated in FIG. 3, and the two engagement parts 47 illustrated in FIG. 2 each engage from above with the outer surface of the third side plate part 183 and the stepped parts 183a and 184a formed on the outer surface of the fourth side plate part 184 from above. As a result, the case 16 is fixed to the inside of the holder 46.

In this state, as illustrated in FIG. 3, in the front-rear direction which is the direction in which the core 11 extends, a third gap G31 is formed between the first side plate part 181 of the case main body 18 and the rear plate part 41 of the holder 46, and a third gap G32 is formed between the second side plate part 182 of the case main body 18 and the front plate part 42 of the holder 46. In this embodiment, a soft adhesive R3 such as a urethane adhesive, a silicon adhesive, a vinyl chloride adhesive, or the like is provided in the third gaps G31 and G32, and the case main body 18 is bonded to the inner wall 48 of the case housing part 40 by the adhesive R3. In FIG. 3, the third gaps G31 and G32 are each schematically illustrated with the same dimension, but the dimension of the third gaps G31 and G32 each need not be uniform.

Main Effects of this Embodiment

As explained above, in this embodiment, since the first gap G1 is provided between the tubular body part 150 of the bobbin 15 and the core 11, transmission of vibration from the core 11 to the bobbin 15 is suppressed. In addition, since the tubular body part 150 and the core 11 are bonded by the soft adhesive R1 provided in the first gap G1, transmission of vibration from the core 11 to the bobbin 15 is suppressed even when the tubular body part 150 of the bobbin 15 and the core 11 are fixed. Accordingly, the generation of noise caused by the vibration of the core 11 can be suppressed.

In addition, since the coupling points between the bobbin 15 and the circuit board 13 are limited to the projection parts 156 and 157, transmission of vibration from the bobbin 15 to the circuit board 13 is suppressed. Moreover, since the circuit board 13 is bonded to the bobbin 15 by the soft adhesive R4 provided between the circuit board 13 and the plurality of projection parts 156 and 157, transmission of vibration from the bobbin 15 to the circuit board 13 is suppressed even when the bobbin 15 and the circuit board 13 are fixed. Accordingly, the generation of noise caused by the vibration of the core 11 can be suppressed.

In addition, since the second gap G2 is provided between the coil 12 and the circuit board 13, transmission of vibration from the coil 12 to the circuit board 13 is suppressed. Moreover, since the circuit board 13 and the coil 12 are bonded by the soft adhesive R2 provided in the second gap G2, transmission of vibration from the coil 12 to the circuit board 13 is suppressed even when the coil 12 and the circuit board 13 are fixed. Accordingly, the generation of noise caused by the vibration of the core 11 can be suppressed.

In addition, in the extending direction (front-rear direction) of the core 11, where vibration is easily transmitted, since the third gaps G31 and G32 are provided between the case 16 and the inner wall 48 of the case housing part 40, transmission of vibration from the case 16 to the inner wall 48 of the case housing part 40 is suppressed. Moreover, since the case 16 and the inner wall 48 of the case housing part 40 are bonded by the soft adhesive R3 provided in the third gaps G31 and G32, transmission of vibration from the case 16 to the inner wall 48 of the case housing part 40 is suppressed even when the case 16 and the inner wall 48 of the case housing part 40 are fixed. Accordingly, the generation of noise caused by the vibration of the core 11 can be suppressed.

In addition, the core 11, coil 12, and bobbin 15 housed in the case 16 are spaced apart from the inner surface of the case 16 so as not to contact the inner surface of the case 16. Accordingly, vibration of the core 11 can be suppressed from being transmitted to the case 16.

In addition, the core 11 includes five core dividers 21 to 25 that are formed separately. This makes it possible to raise the natural frequencies of the individual core dividers 21 to 25 and to shift the natural frequencies of the individual core dividers 21 to 25 out of the human audible frequency range. Moreover, in this embodiment, since the core 11 is formed by integrating five core dividers 21 to 25, which makes it possible to shift the natural frequency from the human audible frequency range, it is possible to suppress the noise generated by the disturbing magnetic field generator 10 even if the coil 12 is made smaller.

In addition, the sealing resin R0 is disposed between the core 11, the coil 12, and the bobbin 15, and the inner surface of the case 16. Therefore, the sealing resin R0 ensures that the core 11, the coil 12 and the bobbin 15 are not in contact with the inner surface of the case 16. Moreover, since the sealing resin R0 is soft, the vibration of the core 11 can be suppressed from being transmitted to the case 16.

Variation of Disturbing Magnetic Field Generator

Figure 7:
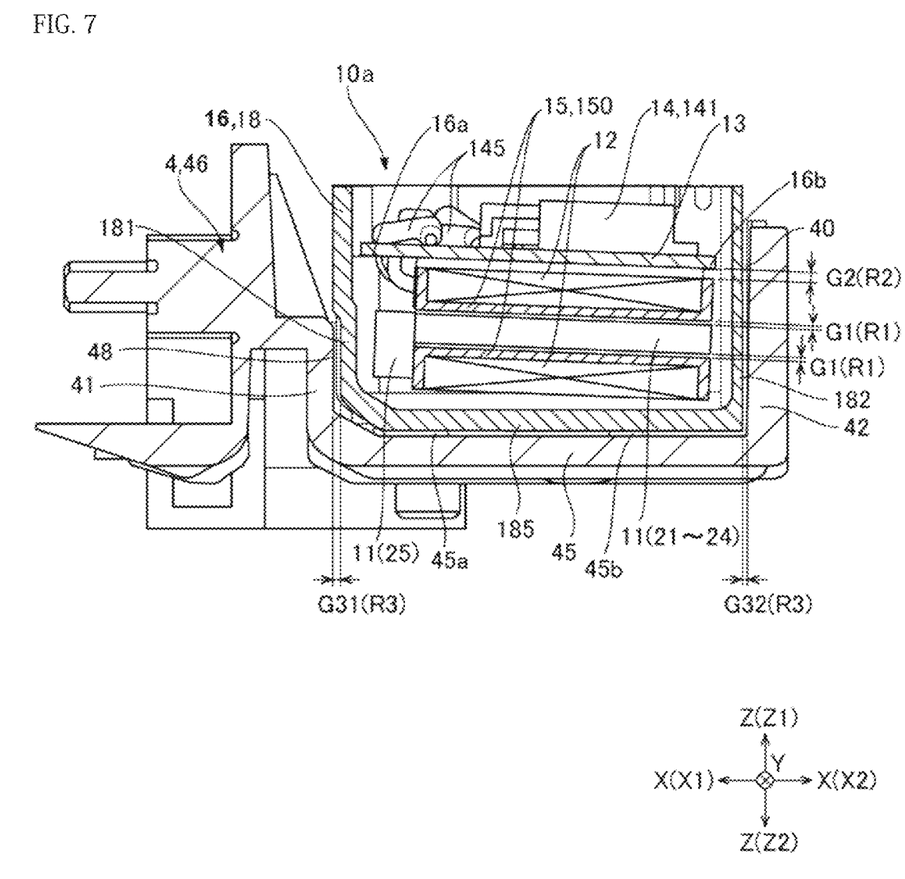
FIG. 7 is a cross-sectional view of a disturbing magnetic field generator or the like according to a variation of at least an embodiment of the present invention.

FIG. 7 is a cross-sectional view of a disturbing magnetic field generator 10A. While the case 16 of the disturbing magnetic field generator 10 illustrated in FIG. 3 includes a case main body 18 formed in the shape of a substantially rectangular box with an openable upper side and a cover 17 which closes the opening of the upper side of the case main body 18, the case 16 of the disturbing magnetic field generator 10a illustrated in FIG. 7 does not include the cover 17. For this reason, the upper side of the case main body 18 is released. The rest of the configuration is the same as the configuration of the disturbing magnetic field generator 10, and thus the description is omitted. The fact that the disturbing magnetic field generator 10a does not include the cover 17 can prevent the generation of noise due to the vibration of the cover 17 caused by the vibration of the core 11.

Variation of Core 11

In the above-described embodiment, the core 11 includes four core dividers 21 to 24 around which the coil 12 is wound. However, the core 11 may have two or three core dividers around which the coil 12 is wound, or five or more core dividers around which the coil 12 is wound. In addition, in the above-described embodiment, the core 11 includes the five core dividers 21 to 25 that are formed separately. However, the core 11 may be formed as a single unit. That is, in the above-described embodiment, the core 11 is divided into the core dividers 21 to 25, but the core 11 need not be divided into core dividers. In the above-described embodiment, the card reader 1 may be a manual card reader in which a user performs reading and recording magnetic data while manually moving the card 2.

What is claimed is:

1. A disturbing magnetic field generator configured to generate a disturbing magnetic field for disturbing unauthorized reading of magnetic data recorded on a card, the disturbing magnetic field generator comprising:
    a coil configured to generate the disturbing magnetic field;
    a bobbin comprising a tubular body part in which the coil is wound on an outer peripheral side of the tubular body part;
    a core disposed inside the tubular body part, wherein a first gap is provided between the tubular body part and the core; and
    a soft adhesive in the first gap, and bonding the tubular body part and the core.

2. The disturbing magnetic field generator according to claim 1, further comprising:
    a circuit board disposed so as to overlap the coil, wherein the circuit board comprises a circuit configured to feed the coil,
    wherein the bobbin comprises a plurality of projection parts, and
    wherein the circuit board is fixed to the bobbin via the plurality of projection parts.

3. The disturbing magnetic field generator according to claim 2, further comprising:
    a further soft adhesive provided between the circuit board and the plurality of projection parts, and bonding the circuit board to the bobbin.

4. The disturbing magnetic field generator according to claim 1, further comprising:
    a circuit board disposed so as to overlap the coil, wherein the circuit board comprises a circuit to feed the coil,
    wherein a second gap is provided between the circuit board and the coil.

5. The disturbing magnetic field generator according to claim 4, further comprising: a further soft adhesive provided in the second gap, and bonding the circuit board and the coil.

6. A card reader comprising:
    the disturbing magnetic field generator according to claim 1; and
    a card insertion part provided with an insertion slot through which the card is inserted, wherein the disturbing magnetic field generator comprises a case in which the coil, the bobbin, and the core are housed inside, wherein the card insertion part comprises a case housing part in which the case is housed inside, and wherein the case is housed in the case housing part in such a manner that an outer wall of the case and an inner wall of the case housing part face each other via a third gap in an extending direction of the core.

7. The card reader according to claim 6, further comprising: a further soft adhesive provided in the third gap, and bonding the case and the inner wall of the case housing part.

8. The card reader according to claim 6, wherein the case comprises a case main body formed in a shape of a rectangular box with an openable upper side, and wherein the upper side of the case main body is released.

9. A card reader, comprising:

the disturbing magnetic field generator according to claim 1; and a card insertion part provided with an insertion slot through which the card is inserted, wherein the bobbin comprises a plurality of projection parts, wherein the disturbing magnetic field generator further comprises a circuit board overlapping the coil and fixed to the bobbin via the plurality of projection parts, wherein the circuit board comprises a circuit to feed the coil, a further soft adhesive between the circuit board and the plurality of projection parts, and bonding the circuit board and the bobbin, and a case in which the coil, the bobbin, and the core are housed inside, wherein the card insertion part comprises a case housing part in which the case is housed inside, and wherein the case is housed in the case housing part in such a manner that an outer wall of the case and an inner wall of the case housing part face each other via a third gap in an extending direction of the core.

10. The card reader according to claim 9, further comprising: a furthermore soft adhesive provided in the third gap, and bonding the case and the inner wall of the case housing part.

11. A disturbing magnetic field generator configured to generate a disturbing magnetic field for disturbing unauthorized reading of magnetic data recorded on a card, the disturbing magnetic field generator comprising:

a coil configured to generate the disturbing magnetic field;

a bobbin comprising:

a tubular body part in which the coil is wound on an outer peripheral side of the tubular body part, and a plurality of projection parts;

a core disposed inside the tubular body part; and a circuit board disposed so as to overlap the coil and fixed to the bobbin via the plurality of projection parts, wherein the circuit board comprises a circuit configured to feed the coil, wherein a gap is provided between the circuit board and the coil.

12. The disturbing magnetic field generator according to claim 11, further comprising: a soft adhesive provided in the gap, and bonding the circuit board and the coil.

13. A card reader comprising:

a card insertion part provided with an insertion slot through which a card is inserted; and a disturbing magnetic field generator configured to generate a disturbing magnetic field for disturbing unauthorized reading of magnetic data recorded on the card, the disturbing magnetic field generator comprising:

a coil configured to generate the disturbing magnetic field, a bobbin comprising a tubular body part in which the coil is wound on an outer peripheral side of the tubular body part, and a plurality of projection parts, a case in which the coil and a core are housed inside, and a circuit board overlapping the coil and fixed to the bobbin via the plurality of projection parts, wherein the circuit board comprises a circuit configured to feed the coil, wherein the card insertion part comprises a case housing part in which the case is housed inside, and wherein the case is housed in the case housing part in such a manner that an outer wall of the case and an inner wall of the case housing part face each other via a gap in an extending direction of the core.

14. The card reader according to claim 13, further comprising:

a soft adhesive provided in the gap, and bonding the case and the inner wall of the case housing part.

15. The card reader according to claim 13, wherein the case comprises a case main body formed in a shape of a rectangular box with an openable upper side, and wherein the upper side of the case main body is released.

* * * * *